United States Patent [19]

Wang

[11] Patent Number: 5,274,845
[45] Date of Patent: Dec. 28, 1993

[54] UNIVERSAL PERSONAL COMMUNICATION SYSTEM AND TRACING SYSTEM THEREFOR

[75] Inventor: Zhonghe Wang, Lake Worth, Fla.

[73] Assignee: Motorola, Inc., Schaumburg, Ill.

[21] Appl. No.: 817,018

[22] Filed: Jan. 3, 1992

[51] Int. Cl.$^5$ ............................................. H04Q 7/00
[52] U.S. Cl. ................................. 455/33.1; 455/54.1; 455/56.1; 340/825.49
[58] Field of Search ................. 455/12.1, 13.1, 13.2, 455/33.1, 34.1, 54.1, 54.2, 56.1, 33.2, 33.3, 33.4, 67.1; 379/59; 340/825.21, 825.52, 825.49

[56] References Cited

U.S. PATENT DOCUMENTS 4,644,347 2/1987 Lucks et al. ..................... 455/56.1
4,891,638 1/1990 Davis ............................... 455/34.1

OTHER PUBLICATIONS

"Call Delivery to Portable Telephones Away From Home Using the Local Exchange Network" By Michael J. Beller pp. 0948-0953, 1991 IEEE.
"Advanced Personal Communicaton System", Kohiyama et al, pp. 161-166, 1990 IEEE.
"Cellular Networking: A Caller's Perspective" By Keith W. Kaczmarek, pp. 1-6, 1989 IEEE.
"Roaming's Growth", Roscoe et al, pp. 48-57 Apr. 1989, Industry Research.
"Personal Communication—Concept and Architecture—" Takeshi, et al, pp. 1351-1357 1990 IEEE.

Primary Examiner—Reinhard J. Eisenzopf
Assistant Examiner—Andrew Faile
Attorney, Agent, or Firm—Daniel R. Collopy; Thomas G. Berry

[57] ABSTRACT

A communication system includes a plurality of organizational layers, a plurality of portable communication units, and a plurality of base stations. Each layer comprises a plurality of nodes. The plurality of nodes includes a plurality of base stations in the first layer, and a plurality of communication services nodes organized into higher layers. Each communication services node includes a database possibly containing information on the locations of one or more portable communication units. The databases constitute a distributed database containing the necessary and sufficient information on the locations of some of the portable communication units within the system, such that any active portable communication unit in its service area will be located using the most direct route. A tracing strategy is realized by the transmission of control messages informing the system of a moving portable communication unit's location. The system tries to set up a connection to the home address of the called portable communication unit, unless some information is found along the path to the home address of the called unit. In case there is information on the called unit its location is indicated by the address chain in the distributed database.

26 Claims, 9 Drawing Sheets

| LAYER | 5 | 4 | 3 | 2 | 1 |
|---|---|---|---|---|---|
| | COUNTRY | STATE | AREA CODE | CITY | LOCATION |

*FIG. 3A*

| LAYER | 5 | 4 | 3 | 2 | 1 | |
|---|---|---|---|---|---|---|
| | U.S.A. | GEORGIA | 404 | ATLANTA | X | CURRENT ADDRESS |
| | U.S.A. | FLORIDA | 407 | BOYNTON BEACH | Y | HOME ADDRESS |

*FIG. 3B*

| | |
|---|---|
| HA1 | ADD1 |
| HA2 | ADD2 |
| HA3 | ADD3 |
| HA4 | ADD4 |

UNIVERSAL PERSONAL COMMUNICATION SYSTEM AND TRACING SYSTEM THEREFOR

TECHNICAL FIELD

This invention relates generally to universal personal communication systems.

BACKGROUND

A universal personal communication system is a system enabling anyone to communicate instantly with anyone else anywhere in the world. One of the crucial problems of such a system would be locating millions of moving customers in an efficient manner. The existing techniques for locating moving customers in the system are paging and registration using a central database. Considering the large number of customers in a global system, the first technique, if applied without knowledge of the location of the customers is impractical. The registration technique, which records all the movements of customers in a central database, is also impractical because the task of keeping track of such a huge number of users would be immense. Thus, a need exists for a system for efficiently tracking customers in a universal personal communication system.

SUMMARY OF THE INVENTION

Briefly, according to the invention, a communication system includes a plurality of organizational layers, a plurality of portable communication units, and a plurality of base stations. Each layer comprises a plurality of nodes. The plurality of nodes comprises a plurality of base stations in the first layer, and a plurality of communication services nodes in the higher layers. Each communication services node includes a database possibly containing information on the locations of one or more portable communication units. The databases constitute a distributed database containing information on the locations of the portable communication units within the system.

In another aspect of the invention, a method for establishing a connection between a calling and a called communication unit in the above-mentioned communication system is provided. An active portable communication unit in one of its service areas will be located by the system when a calling communication unit initiates a connection request.

In still another aspect of the invention, a method for updating the databases in the communication services node by transmission of some control messages is provided.

BRIEF DESCRIPTION OF THE DRAWINGS

FIGS. 3A and 3B are a possible address structure in accordance with the invention.

FIG. 4 is a possible database of a node at layer k.

DETAILED DESCRIPTION OF THE PREFERRED EMBODIMENT

Figure 1:
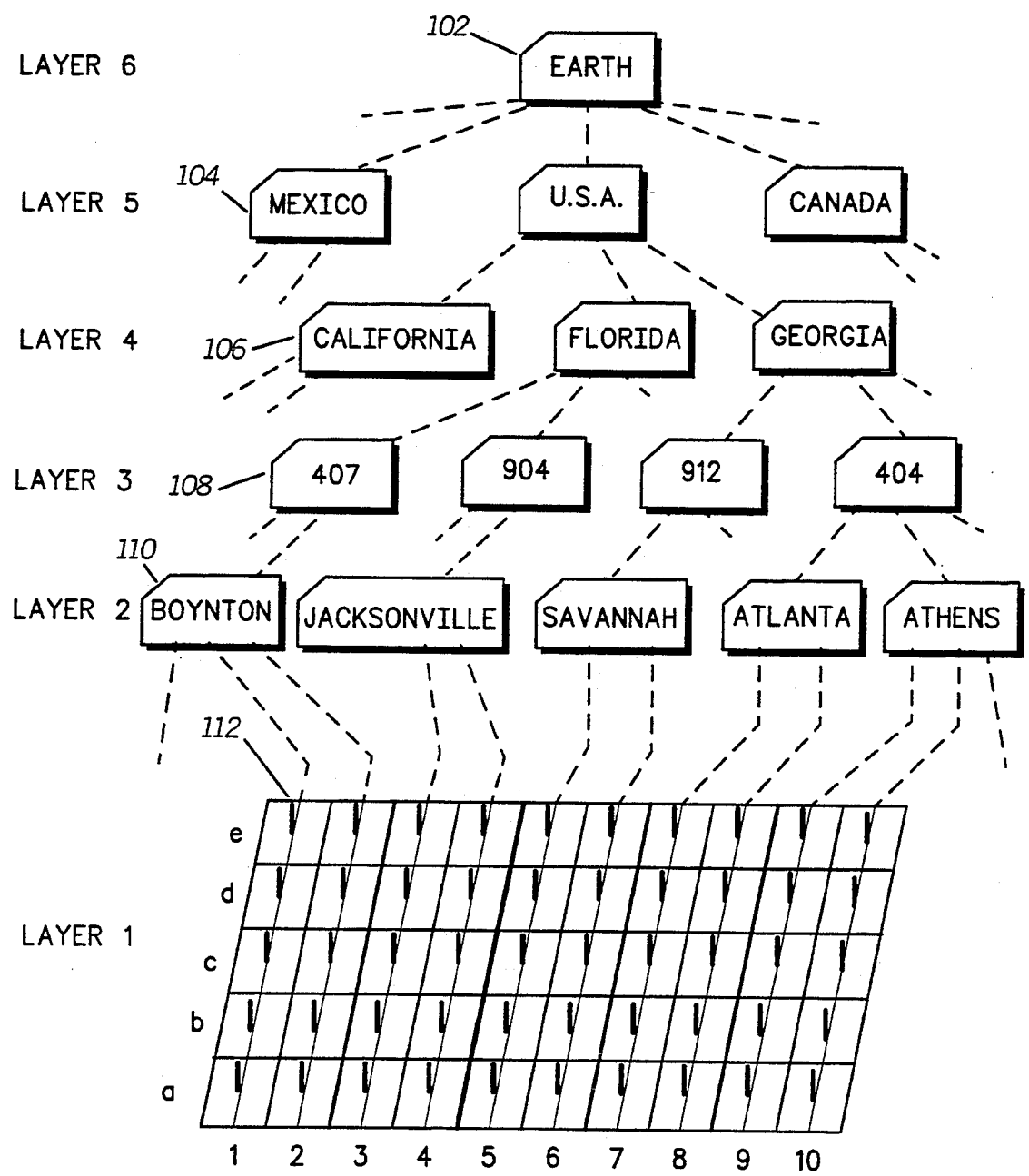
FIG. 1 is a hierarchical structure for a communication system in accordance with the invention.

Referring to FIG. 1, there is shown a hierarchical structure for a communication system 100 in accordance with the invention. The covered area of the communication system 100 is organized into a hierarchical structure having several layers. The highest layer may be the earth 102 followed by country 104, state 106, area code 108, city 110, and the lowest layer (Layer 1) is a primary layer that comprises a plurality of independent paging regions (cells) 112. Each layer 1 cell comprises one or more base stations. Layer 1 may comprise a radio telephone communication system (e.g., Digital European Cordless Telephone). Not losing generality, from now on layer 1 cells shall be referred to as base stations. Each region of layer "i" (except the lowest layer) consists of several regions of layer "i−1.".

Each block in layers 2 through 6 (the secondary layers) is a communication service node representing a switching station having computing and memory means (i.e., all layers >1 are intelligent layers). The memory means comprises a database for tracking the location of customers (i.e., users of portable communication units that are registered in the system).

Figure 2:
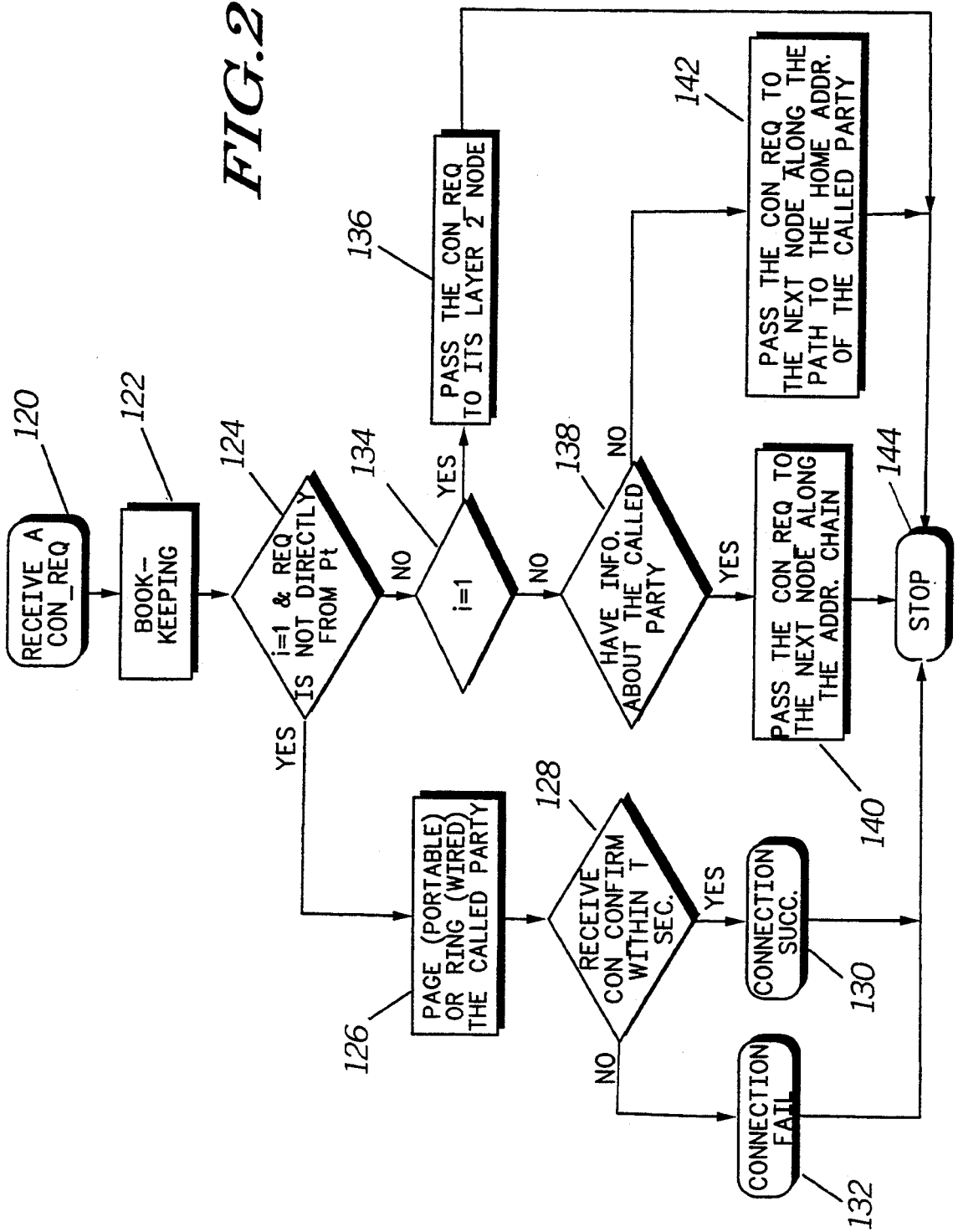
FIG. 2 is a flow chart of a process carried out at a node for locating a portable communication unit in accordance with the invention.

Referring to FIG. 2, there is shown a flow chart illustrating a process for receiving a connection request for a layer i node. In step 120, a connection request packet is received at a node in layer i. The connection request packet, sent by a calling communication unit, requests a connection between the calling communication unit and a called (portable) communication unit. The call request packet comprises a code identifying the called portable unit. In step 122 the system keeps track of the possible connections (i.e., bookkeeping).

In decision 124, a determination is made as to whether (1) the connection request is received at the first layer and (2) the connection request was not received directly from a portable communication unit. If the determination of decision 124 is affirmative, the called party is paged (if it is a portable) or rung (if it is a fixed telephone) (step 126). In decision 128, it is determined whether a connection confirmation signal is received from the called communication unit within a predetermined period of time. If the determination made in decision 128 is affirmative, the connection is successful (step 130). If it is negative, the connection attempt fails (step 132).

If the determination in decision 124 is negative, then a further decision 134 is made to determine whether the connection request was received in the first layer. If decision 134 is affirmative, the connection request is passed to its parent node in layer two (step 136). The process then continues to the stop step (144) for that node.

If decision 134 is negative a further decision 138 is made to determine whether there is any information relating to the called party in the database corresponding to the current node. If decision 138 is affirmative, the connection request is passed to the next node along the address chain (step 140). If the determination in step 138 is negative, the connection request is passed to the next node along the path to the home address of the called party (step 142). Following either step 140 or 142, the process stops (step 144) for the node passing on the connection request, and begins at step 120) for the next node receiving the connection request.

Referring to FIGS. 3A and 3B, there is shown a set of possible address structures for portable communication units. These address structures include a field for each of the layers.

There are two kinds of addresses used in the system: (1) home addresses; and (2) physical addresses. The home address is the registered address of the portable communication unit (i.e., the same as a telephone number). The incoming calls will find the portable communication unit in this address unless it has moved to another area or it has been turned off. The physical address is the address where the portable communication unit can be actually reached. When hand over (or hand-off) happens, two physical addresses are needed: (1) the current address, which indicates the physical address of the base station to which the portable unit is locking; and (2) the new address, which indicates the physical address of the desired new base station. In the case of a fixed subscriber, the physical address is always identical to the home address. The physical address of a portable communication unit is obtained in the messages broadcasted from the port.

Referring to FIG. 4, there is shown a representation of a possible database of a node. "HAj" is the home address of customer "j" and "Addj" is the current address field for customer "j".

A customer is classified by the number of the lowest layer that covers all the service areas of the customer. A service area is any area that the customer selects to be reached at. The home address of a customer must be in one of the service areas. The symbol "pc" is used to denote the class of the customer.

Referring again to FIG. 1, for example pc=4, if customer 1 wants to be reached anywhere in area code 404 and Savannah because the lowest level common node (Georgia) is at layer 4. If customer 2 wants to be reached anywhere in area code 407, Atlanta and California, the pc will be 5 because the lowest level common node (U.S.A.) is at layer 5. Also, pc=2 if customer 3 wants to be reached only in Boynton. The service areas are chosen by customers and the associated information is stored in the portable communication units. The information may also be stored elsewhere (e.g., for credit purposes). The classification pc of a portable communication unit is derived easily from its service areas as follows: Define $SA_i$ be the address of the ith service area of the portable communication unit which contains all the layer addresses from the service area and up with all the lower addresses filled with "don't care" marks '?'. For example, if the second service area of a portable communication unit is Florida, the $SA_2$ of the customer will be {U.S.A., Florida,?,?,?}. Also, if the third service area of the customer is Atlanta, the $SA_3$ will be {U.S.A., Georgia, 404, Atlanta,?}. Define $Q_{ij}$ to be the highest layer where the address of the ith and the jth service area of a customer are different. For customer 1, for example, $Q_{12}=3$. Suppose no more than M service areas are chosen by each customer. Then the customer class is:

$$pc = 1 + \max Q_{ij}$$

where $i, j \in M$

There are three kinds of entities in the database of layer i with each entry associated with an active customer of class i or higher:
(1) portable communication units which registered in the ith layer region and are now outside the region (i.e., native customers that are outside the covered area);
(2) the portable communication unit which registered outside the ith layer region and is now inside the region (i.e., a foreign customer having a home address outside and a current address inside the covered area); and
(3) portable communication units which registered in the ith layer region and are now inside the region, but in a different i-1 layer region from where they registered (i.e., a native customer having a different current address from its home address at the next lower layer).

The address information field may contain one of the following three entries:
(1) an "out" mark which indicates that the native portable communication unit is outside the covered region;
(2) the physical address of the i-1 layer for the foreign portable communication unit; and
(3) physical address of i-1 layer for the native portable communication unit.

In this system an active customer does not necessarily communicate on the portable communication unit, but the movement of the portable communication unit is traced by the system. A customer is active when the power of the portable communication unit is on. To reduce the burden on the system, it is possible to charge customers in terms of the number of tracing messages for their portable communication units. A class 0 customer is defined to be reached only at its home address (i.e., a fixed telephone).

Figure 5:
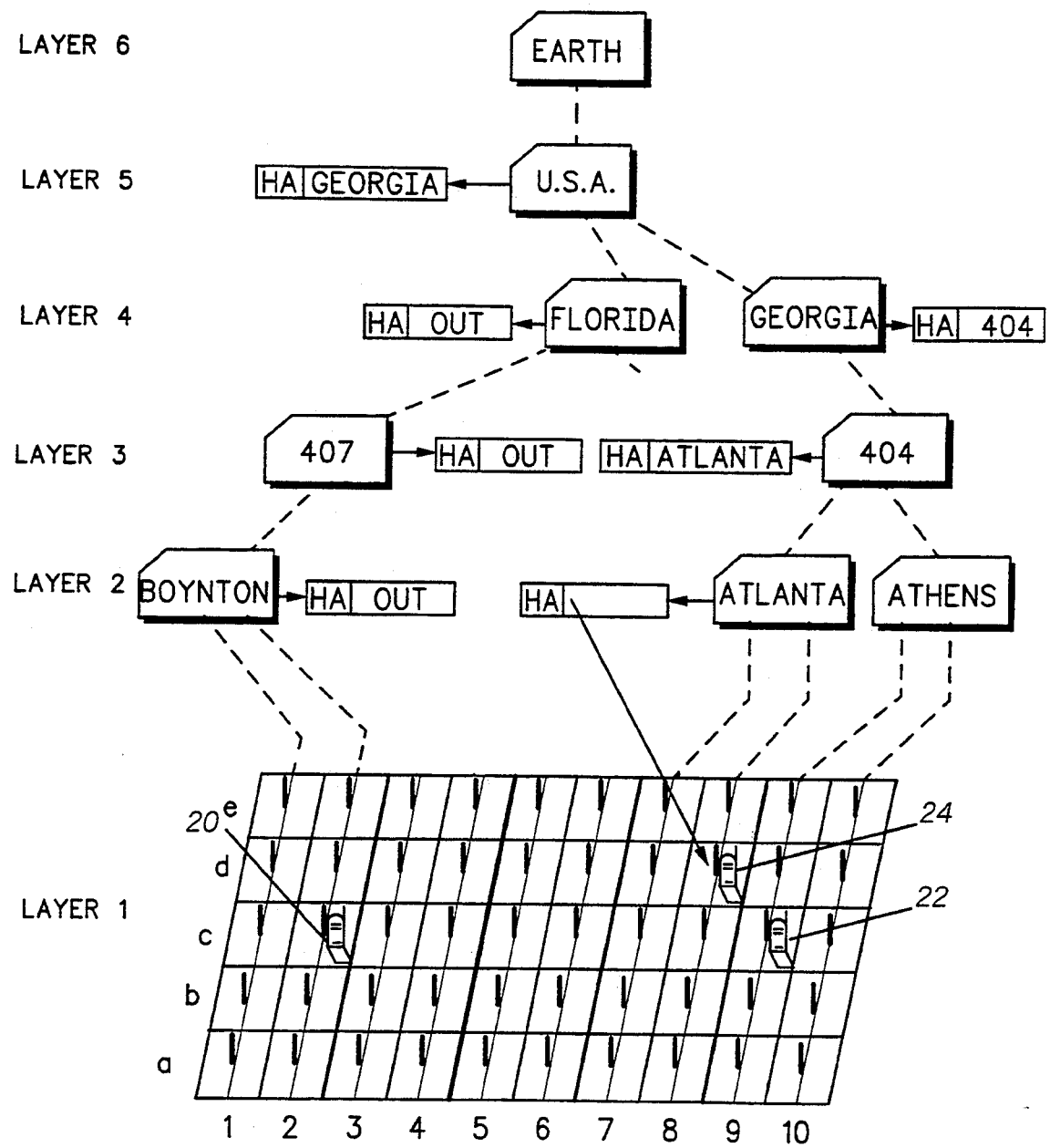
FIG. 5 is an example of an address chain for a customer of class 5 or 6, before moving.

Referring to FIG. 5, there is shown a diagram illustrating an example of an address chain before moving for a portable communication unit 24 of class 5 or 6. In this example, the called party (unit 24) has a home address in cell 1,d, and a current address at cell 8,d. In a first case, the communication unit 20, located in cell 2,c, places a call to communication unit 24. The communication unit 20 merely dials the home address number of the called party. The calling party's connection request is received by a base station at cell 2,c, and it is passed on to the Boynton node in layer 2.

At the Boynton node, the corresponding database is searched for an entry relating to the called party. In this case an entry is found in the database. The entry contains the home address (HA) of the called party and an "out" indication. The call is then forwarded along the address chain to the "407" node of layer 3, where the database also contains the home address of the called party and an "out" indication. Thus, the connection request is further traced up through the Florida node of layer 4, also indicating that the called party is "out". Then, in the U.S.A. node of layer 5 the database indicates that the portable 24 is in Georgia. The tracing then continues to the Georgia node, where the area code 404 is indicated. Thereafter, the tracing process continues to the 404 node, where "Atlanta" is indicated. Searching in the Atlanta database reveals the precise location of the portable communication unit 24, and the requested connection is made.

Referring again to FIG. 5, in a second case the call for the called party is made from a calling communication unit 22 (also a portable in this example) located at cell 9,c. Accordingly, the call is received at the base station in cell 9,c, and is passed on to the Athens node in layer 2. There is no entry relating to the called party in the Athens database. Therefore, the connection request is passed on to the next node toward the home address of the called party (i.e., the "404" node). The database at the "404" node contains an entry (HA, Atlanta) indicating that the called party is in Atlanta. The connection request is accordingly passed on to the Atlanta node where the exact location of the portable 24 is determined to be in the 8,d cell, and the requested connection is made.

The problem remaining is how to maintain the databases. The database updating process is initiated by portable communication units. Each base station continuously transmits its subsystem identification information. By monitoring this information from the surrounding bases, an active portable communication unit is able to select a desired base station (e.g., the strongest base) and lock on to it. Whenever a new strongest base is found, up to two messages may be transmitted to the associated bases to update address chains. The address of the base to which the portable communication unit is locking is called the current address and the address of the base of the new strongest base is called the new address.

In order to update the tracing chains it is required to introduce the layer difference numbers $R_{ch}$, $R_{nc}$, and $R_{nh}$ and the layer difference indexes $C_{ch}(i)$, $C_{nc}(i)$, $C_{nh}(i)$ and $C_{hn}*(i)$ where the subscript ch indicates that the difference is in terms of the current address and the home address and nh is in terms of the new address and the home address. The above-mentioned addresses are portable communication unit addresses. Similarly, nn* is in terms of the new address of the portable communication unit and the address of the ith layer node at which the M message was received and hn* is in terms of the home address of the portable communication unit and the address of the ith layer node at which the M message was received.

The layer difference number $R_{ch}$ is the number of the highest layer where the current address and the home address of the portable communication unit are different. For example in FIG. 1, $R_{ch}=4$ if a portable communication unit is located (current address) somewhere in Atlanta (col. 7) and is registered (home address) somewhere in Boynton Beach (col. 1 or 2). The other layer difference numbers are defined in the same manner.

The layer difference index $C_{nh}(i)=True$ if the new address and the home address of the portable communication unit are the same at the ith layer, otherwise $C_{nh}(i)=False$. For example (see FIG. 1), $C_{nh}(4)=True$, and $C_{nh}(3)=False$, if the portable communication unit finds a new strongest port (new address) in Jacksonville and is registered (home address) somewhere in Boynton Beach. The other layer difference indexes are defined in the same manner.

The value of all the layer difference numbers and layer difference indexes are derived easily from the addresses.

Definitions:

Active(t) = True, if the portable communication unit is active at time t, or False, otherwise.

Turn_on = True, if not Active (t) and Active(t+Δt), or False otherwise.

Turn_off = True, if Active(t) and not Active(t+Δt), or False, otherwise.

Define $SA = U_{i=1..M}$ area $(SA_i)$, where area $(SA_i)$ is the ith service area represented by the address $SA_i$.

Also define:

$IN_c$ = True, if current address ∈ SA, or False, otherwise, $IN_n$ = True, if new address ∈ SA, or False, otherwise.

The basic ideas of the algorithm that portable communication units employ are as follows.

An active portable monitors the environment for base signals. The portable determines (1) whether the current and new addresses are both inside the service area (i.e., whether INc and INn are true), and (2) whether the new address and the current address are not the same at the first layer (i.e, whether a paging boundary is crossed, or Cnc(1) is false). If the current and new addresses are both inside the service area, and the new address and the current address are not the same at the first layer, the portable communication unit transmits a message (M1) if the new and home address are different at the first layer. If the current and new address are both inside the service area, and the new address and the current address are not the same at the first layer, and the portable communication unit is not in the registered position (i.e., the current address is not the home address), it transmits a second message (M2) to the current port. The portable communication unit then continues monitoring the environment.

The portable also determines whether it is outside its home address, and whether the following additional conditions are met: (1) it is in its service area and turned off, (2) it is inside its service area but moving outside of its service area, or (3) there exists unsuitable usage conditions. If the above determination is affirmative, the portable transmits a message (M3) to the current port. The portable communication unit then continues monitoring the environment.

The portable also determines whether (1) the portable is not at its home address, and (2) it is activated (i.e., turned on) inside its service area or it is moving into a service area. If those conditions are met, a fourth message (M4) is sent to the new port and the portable communication unit continues to monitor the environment. The foregoing discussion may be represented by the following case statement:

---

Case
Begin
   INc & INn & not Cnc(1): Send M1 to new port if not Cnh(1)
                                   Send M2 to current port if not Cch(1)
   not Cch(1) & [INc & Turn_off) or (INc & not INn) or unsuitable usage]:
                Send M3 to current port
   not Cnh(1) & [(INc & Turn_on) or (INn & not INc)]:
                Send M4 to new port
End

---

There are five fields in each of the M messages: (1) message type, (2) current address, (3) new address, (4) home address, and (5) pc.

After receiving these M messages, the base station transmits them immediately to its layer i+1 parent node.

The logic of the process employed at each of the nodes of layer i after receiving M messages is as follows.

Figure 6:
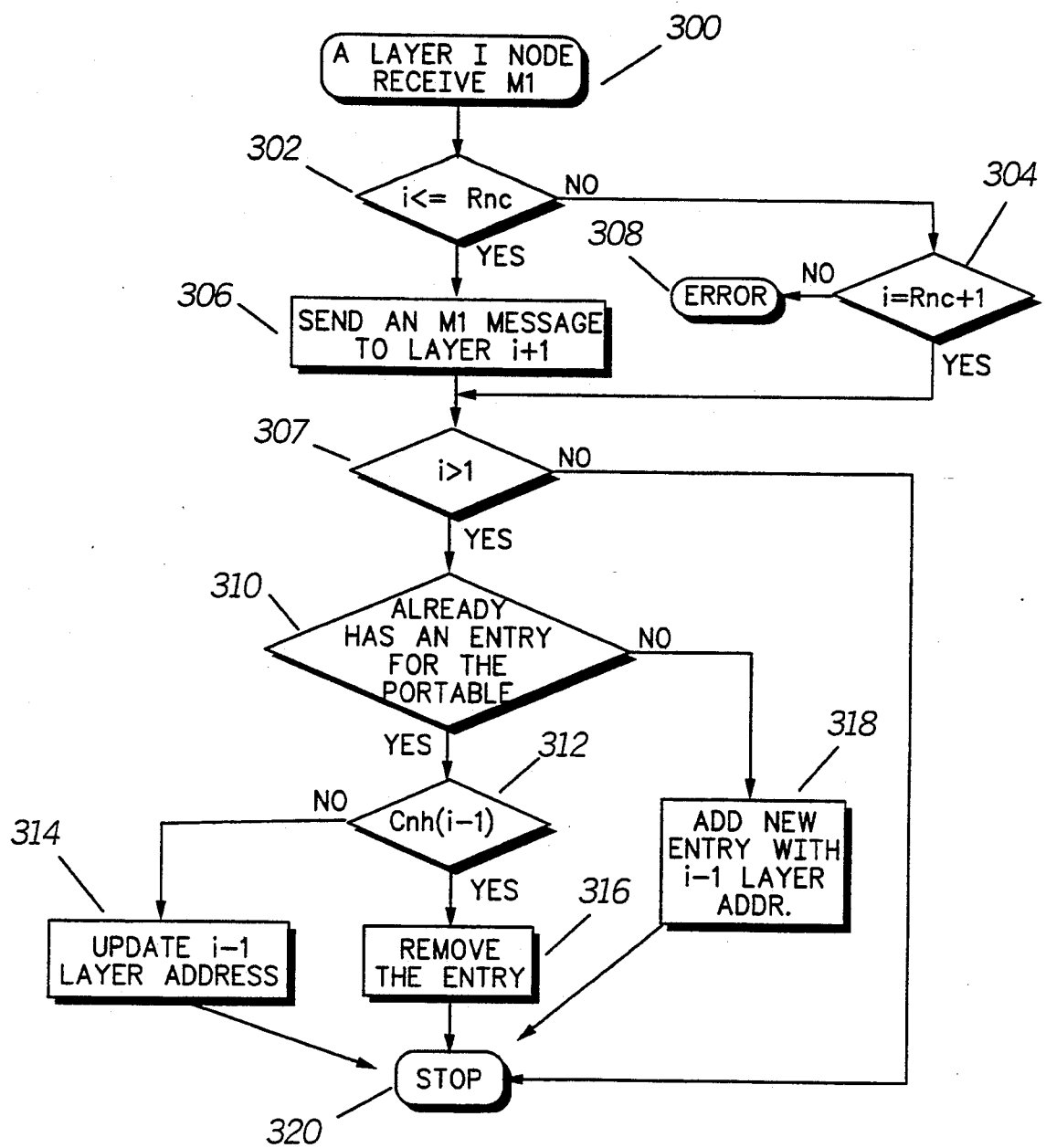
FIG. 6 is a flow chart for nodes receiving a message M1.

Referring to FIG. 6, there is shown a flow chart for nodes receiving M1 messages. In step 300 a first message M1 is received in a node in layer i. A decision 302 is then made determining whether i is less than or equal to the number of the highest layer where the new and current addresses of the portable communication unit are different (i.e., whether $i \leq R_{nc}$). In step 306, the message M1 is sent to its layer i+1 parent communication service node when the determination of step 302 is affirmative.

Then in decision 307 it is determined whether i is greater than one. When the determination of step 307 is negative, the process is stopped (320) for the node in layer one. When decision 307 is affirmative, a further decision 310 is made determining whether there is an entry for the portable communication unit in the database of the layer i node.

When the determination of step 310 is affirmative, a decision 312 is made determining whether the new address and the home address of the portable communication unit are the same at the i−1 layer.

When the determination of step 312 is affirmative, the entry relating to the portable communication unit at the database of the layer i node is removed in step 316, and the process stops (320) for the communication service node in layer i.

When the determination of step 312 is negative, the i−1 layer address relating to the portable communication unit is updated and the process stops (320) for the layer i node.

When the determination of step 302 is negative, a further decision 304 is made to determine whether i is equal to the sum of one and the number of the highest layer where the new address and the current address of the portable communication unit are different.

When the determination of step 304 is affirmative, the process continues at decision 307. When the determination of step 304 is negative, it is determined (in step 308) that an error exists.

When the determination of step 310 is negative, a new entry will be added in the database at the layer i node with the layer i−1 new address of the portable communication unit stored in the address field in step 318, and the process is stopped (320) for the layer i communication services node.

Figure 7:
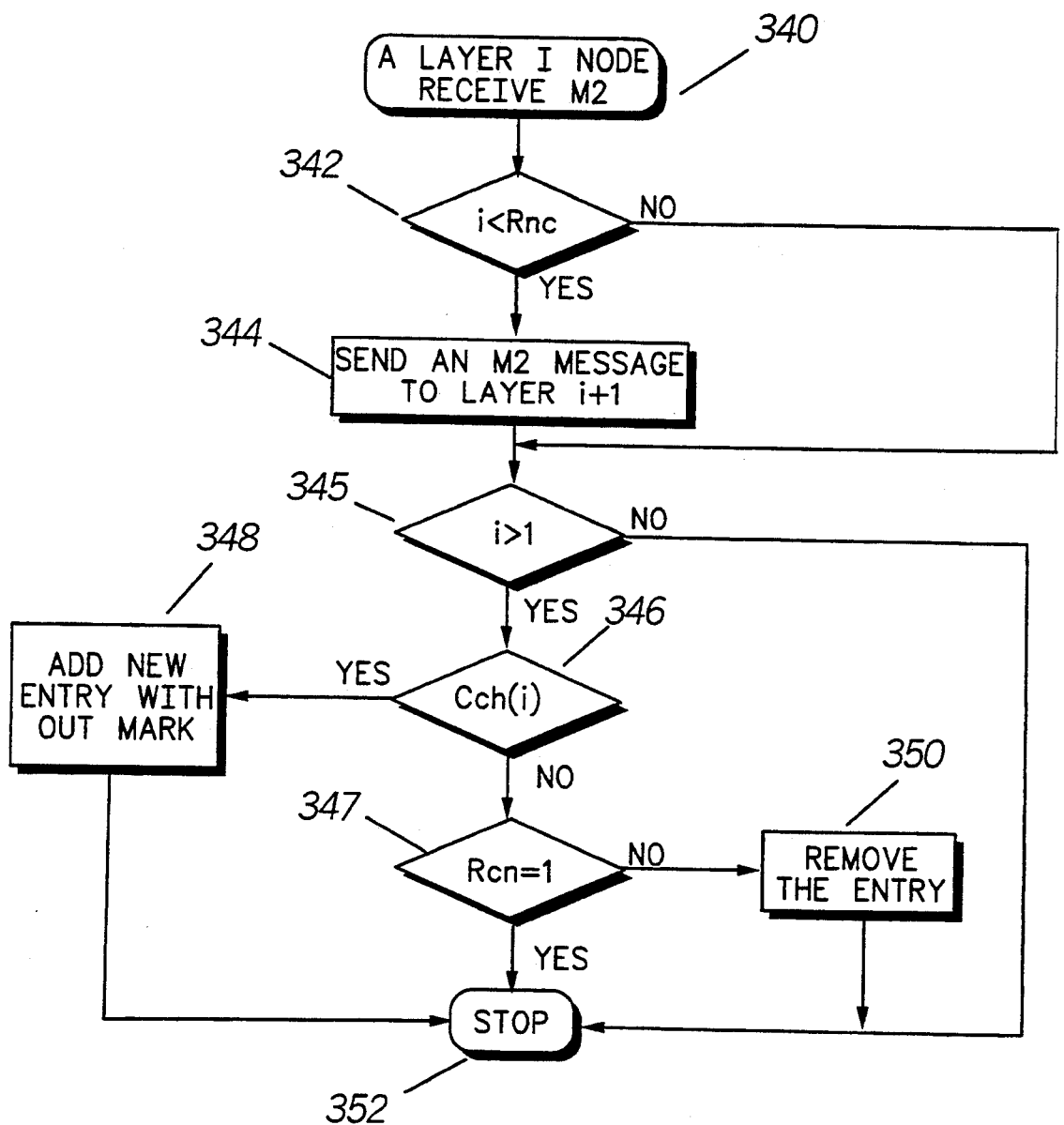
FIG. 7 is a flow chart for nodes receiving a message M2.

Referring to FIG. 7, there is shown a flow-chart for nodes receiving M2 messages. In step 340, the second message M2 is received in a base station or a communication service node in layer i.

In decision 342 it is determined whether i is less than the number of the highest layer where the new address and the current address of the portable communication unit are different. When the determination of step 342 is negative, the process proceeds to step 345. When the determination of step 342 is affirmative, the M2 message is sent to its layer i+1 parent node in step 344.

Then in decision 345 it is determined whether i is greater than 1. When the determination of step 345 is affirmative, a further decision 346 is made to determine whether the current address and the home address of the portable communication unit are the same at layer i. When the determination of step 345 is negative, the process stops (352) for the layer i node.

When the determination of step 346 is affirmative, a new entry relating to the portable communication unit with an "out" mark is added (in step 348) in the database at the layer i node. The out mark indicates that the portable communication unit is not at its home address. The process then stops (352) for the layer i communication services node. When the determination of step 346 is negative, a further decision 347 is made to determine whether the first layer is the highest layer where the current address and the new address of the portable communication unit are different.

When the determination of step 347 is negative, the entry relating to the portable communication unit in the database of the layer i node is removed in step 350, and the process for the layer i communication services node is stopped (352). When the determination of step 347 is affirmative, the process for the layer i communication services node stops (352).

Figure 8:
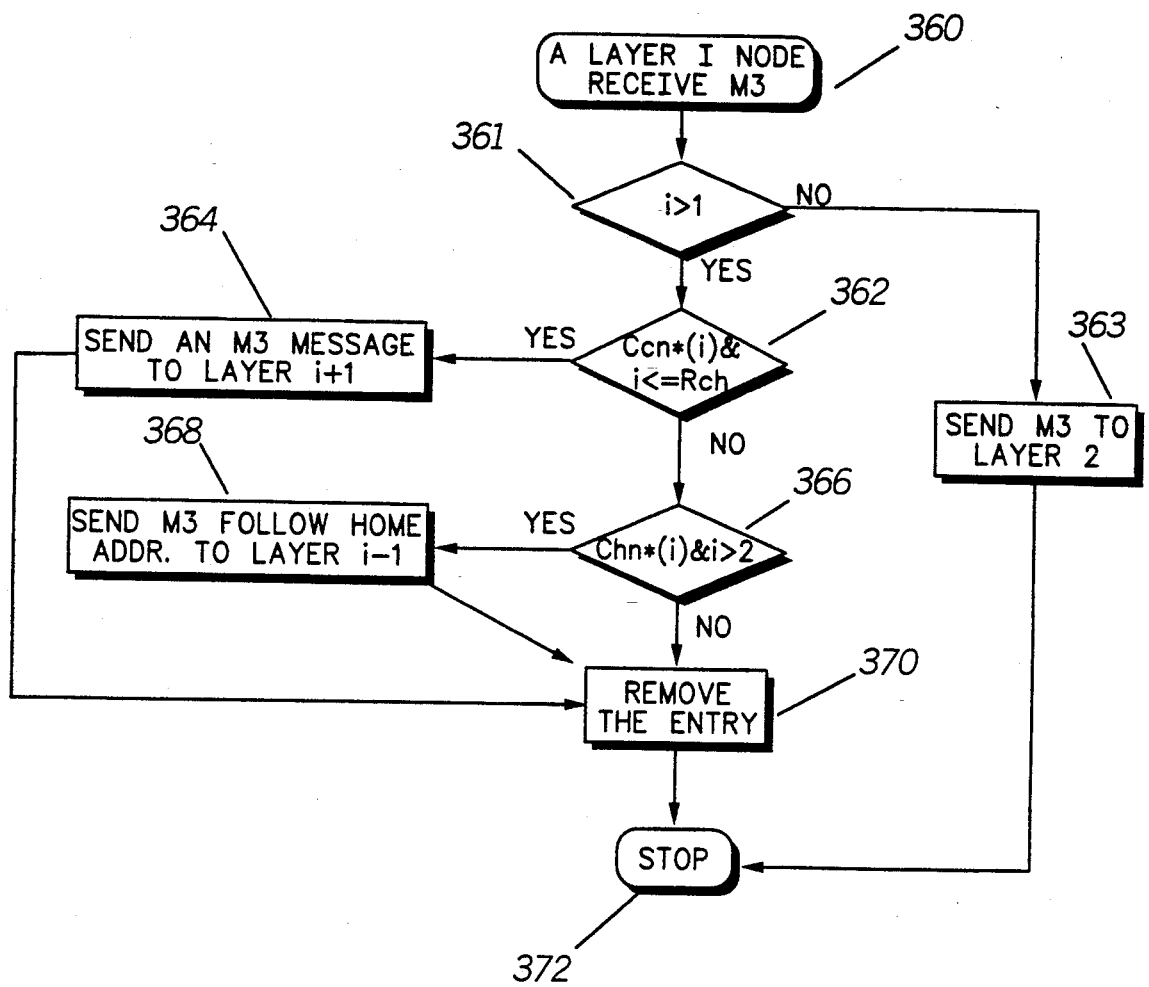
FIG. 8 is a flow chart for nodes receiving a message M3.

Referring to FIG. 8, there is shown a flow-chart for nodes receiving M3 messages. In step 360, the third message $M_3$ is received in a node in layer i.

In decision 361, it is determined whether i is greater than one. When decision 361 is negative, the third message is sent to its second layer parent node, and the process stops (372) for the node in layer one. When the determination of decision 361 is affirmative, a further decision 362 is made determining whether the current address of the portable communication unit and the address of the node, at which the third message was received, are the same at layer i, and whether i is less than or equal to the number of the highest layer where the current address and the home address of the portable communication unit are different.

When decision 362 is affirmative, the M3 message is sent to its layer i+1 parent node in step 364. Then in step 370 the entry relating to the portable communication unit is removed from the database of the node in which the third message was received, and the process stops (372) for the layer i communication services node.

When decision 362 is negative, a further decision 366 is made to determine whether the home address of the portable communication unit and the address of the node in which the third message was received are the same at layer i, and whether i is greater than two. When decision 366 is affirmative, the third message is sent to its layer i−1 child node along the path leading to the home address of the portable communication unit, and the process continues at step 370. When decision 366 is negative, the process continues at step 370.

Figure 9:
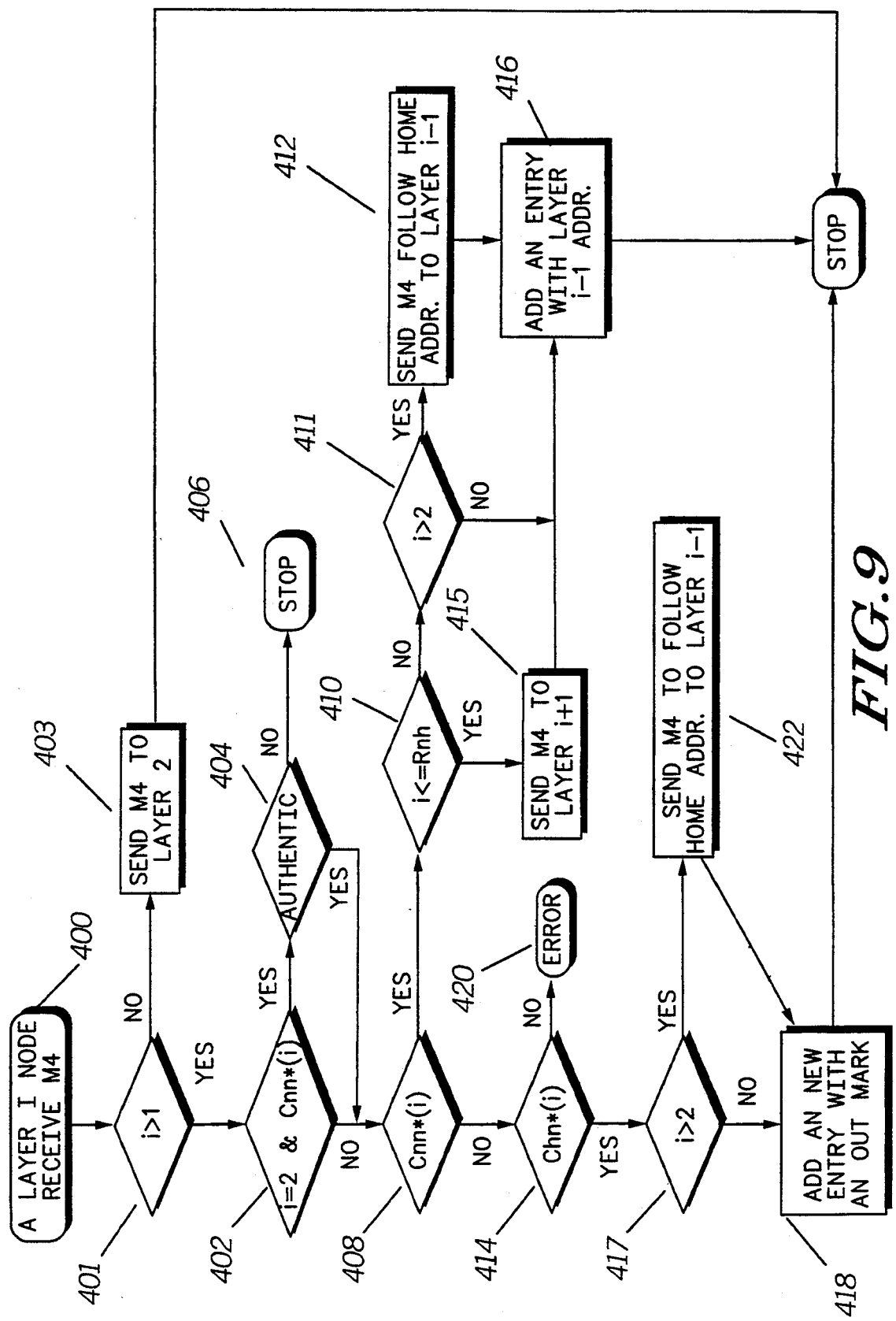
FIG. 9 is a flow chart for nodes receiving a message M4.

Referring to FIG. 9, there is shown a flowchart for nodes receiving M4 messages. In step 400 a layer i node receives an M4 message. In decision 401 it is determined whether i is greater than one. If decision 401 is affirmative, a further decision 402 is made to determine if i equals two, and if the new address of the portable communication unit and the address of the node at which the fourth message was received, are the same at layer i. If decision 402 is negative, a decision 408 is made. If decision 402 is affirmative, a decision 404 is made.

In decision 404, the layer i node will make an authentication test to determine whether the customer (portable communication unit) is authentic. If decision 404 is negative, the process stops (406) for the layer i node. If decision 404 is affirmative, the process continues at decision 408.

In decision 408 it is determined whether the new address of the portable communication unit and the address of the node at which the fourth message was received, are the same at layer i. When decision 408 is negative, the process continues at decision 414. When decision 408 is affirmative, a further decision 410 is made determining whether i is less than or equal to the number of the highest layer where the new address and the home address of the portable communication unit are different.

When the determination of step 410 is affirmative, the fourth message is sent to its layer i+1 parent node in step 415, and the process continues at step 416. When the determination of step 410 is negative, a further decision 411 is made determining whether i is greater than two.

If decision 411 is affirmative the fourth message is sent to the layer i−1 child communication services node along a path leading to home address of the portable communication unit. Then the process continues at step 416. If decision 411 is negative, the process continues at step 416. In step 416, an entry with the layer i−1 address of the portable communication unit is added in the database of the node, and the process stops for the layer i communication services node.

In decision 414 it is determined whether the home address of the portable communication unit and the address of the node at which the fourth message was received, are the same at layer i. If decision 414 is negative then it is determined in step 420 that there is an error, and the process stops.

When the determination of step 414 is affirmative, a further determination is made as to whether i is greater than two in decision 417. If decision 417 is affirmative, the fourth message is sent (422) to the the layer i−1 child communication services node along a path leading to the home address of the portable communication unit, and the process continues at step 418. If decision 417 is negative, the process continues at step 418.

In step 418, a new entry relating to the portable communication unit with an "out" mark is entered in the database at the layer i node, and the process stops for the layer i communication services node. The out mark indicates that the portable communication unit is not at its home address.

Figure 10:
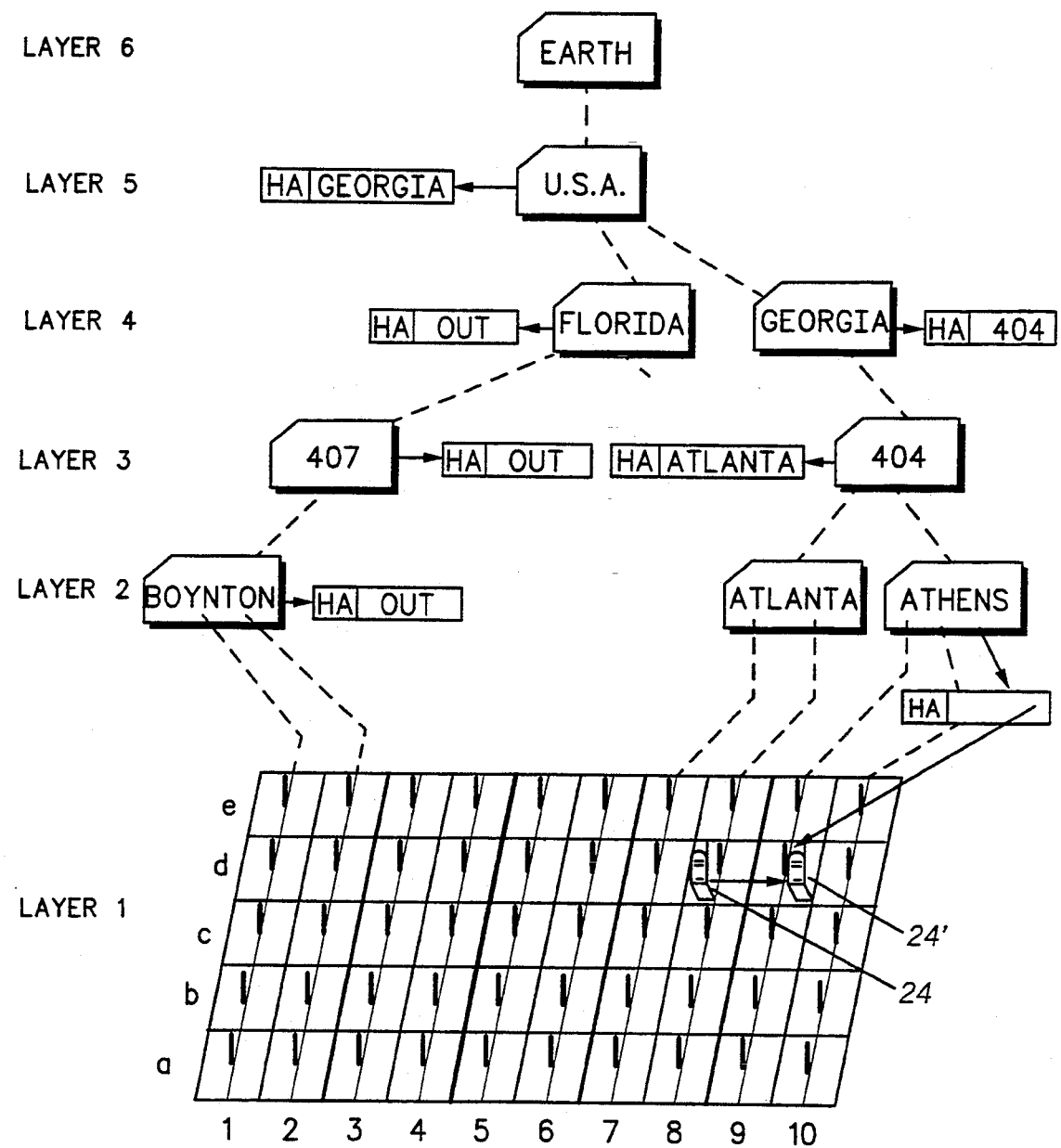
FIG. 10 is an example of an address chain after moving for a customer of class 5 or 6.

Referring to FIG. 10, there is shown an example of an address chain for a customer of class 5 or 6 (after moving). In this example, the user of portable communication unit 24 has a home address as follows: (U.S.A., Florida, 407, Boynton, 1,d). The portable 24 is moving from 8,d to 9,d (indicated by the portable's phantom image 24'). Thus, the portable 24 has a current address as follows: (U.S.A., Georgia, 404, Atlanta, 8,d), and a new address as follows: (U.S.A., Georgia, 404, Athens, 9,d). As the portable 24 moves out of cell 8,d, it transmits a message M1 to the base station in cell 9,d, and an M2 message to the base station at cell 8,d.

According to the invention, when the base station at 9,d receives the M1 message, it is transmitted to the Athens node. When the Athens node receives the M1 message it will send the message to node 404, and add an entry indicating that the portable unit 24 is currently in cell 9,d. Then the 404 node updates the entry to indicate that the current address for unit 24 is now in Athens.

Thus a communication system in accordance with the invention provides a distributed database including location information relating to portable communication units within the system, and processes for tracing the portable communication units and for updating their locations, thus avoiding the necessity of maintaining a single database for the whole system.

What is claimed is:

1. A communication system comprising:
a plurality of portable communication units and a plurality of stationary communication units;
a plurality of nodes organized into a plurality of layers, the plurality of layers arranged into a first layer and a plurality of higher layers, the first layer having an integer value equal to one associated therewith and each of said plurality of higher layers having an integer greater than one associated therewith, and the plurality of nodes including:
a plurality of base stations organized into the first layer; and
a plurality of communication service nodes organized into the plurality of higher layers; and
a plurality of databases,
wherein each of said plurality of base stations and each of said plurality of communication service nodes is assigned to unique parent nodes, said unique parent nodes being a unique ones of said plurality of communication services nodes at ones of said plurality of levels having an integer associated therewith that is greater than the integer associated with the one of said plurality of layers that said each of said plurality of base stations or said each of said plurality of communication service nodes is organized into, and
wherein each of said plurality of portable communication units has a home address and a physical address associated therewith, and wherein each physical address comprises a current address and a new address, each of said physical address and current address indicating one of said plurality of base stations and unique parent nodes assigned thereto, and
wherein each of said plurality of communication service nodes has one of the plurality of databases associated therewith, each of said plurality of databases for storing said home address and said physical address of said plurality of portable communication units, one of said plurality of portable communication units communicating with one of said plurality of communication service nodes associated with one of said plurality of databases when said one of said plurality of databases has stored therein said home address associated with said one of said plurality of portable communication units.

2. In a communication system comprising a plurality of portable communication units, a plurality of base stations organized into a first layer, i=1, and a plurality of communication service nodes organized into a plurality of higher layers, i>1, where i is an integer, each portable communication unit including a home address and a physical address associated therewith, each physical address comprising a current address and a new address, and each communication service node in a layer, other than the first, having a database associated therewith, each base station and each lower layer communication service node having a unique parent node in each of the higher levels, a process for establishing a connection between a calling communication unit and a called communication unit comprising the steps of:

(a) receiving a connection request, at a base station or communication service node in layer i, the connection request requesting the establishment of a communication link between the calling communication unit and the called communication unit;

(b) determining whether layer i is in the first layer, and whether the connection request was received from a portable communication unit;

(c) calling the called communication unit when the connection request was received by a communication service node in the first layer, and the connection request was not received directly from a portable communication unit;

(d) determining whether a connection confirmation has been received from the called communication unit within a predetermined period;

(e) establishing the communication link when connection confirmation has been received from the called communication unit within a predetermined period and stopping the process for the first layer node; and (f) reporting a communication failure to the communication system, when the determination of step (d) is negative and stopping the process for the first layer node.

3. The process of claim 2, further comprising the steps of:

(g) determining whether layer i is the first layer, when it is determined in step (b) that the connection request was received directly from a portable communication unit, or that i is greater than one; and (h) passing the connection request to its second layer parent communication service node, when the determination of step (g) is affirmative and stopping the process for the first layer node.

4. The process of claim 3, further comprising the step of:

(i) determining whether there is an entry relating to the called communication unit in the database of the communication service node receiving the connection request, if it is determined in step (g) that layer i is not the first layer.

5. The process of claim 3, further comprising the steps of:

(j) passing the connection request to the communication service node or the base station whose address is indicated in the address field of the associated item in the database, when the determination of step (i) is affirmative and stopping the process for the layer i node; and (k) passing the connection request to the next layer node along the path leading to the called communication unit'home address, when the determination of step (i) is negative and stopping the process for the layer i node.

6. In a communication system comprising a plurality of portable and stationary communication units each operating in a service area defined by a user of a communication unit, a plurality of nodes including a plurality of base stations which form a first layer for the communication system, and a plurality of communication service nodes organized into a plurality of higher layers, each portable communication unit including a home address and a physical address associated therewith, each physical address comprising a current address and a new address, each communication service node comprises a database of portable communication unit addresses, and each base station and lower layer communication service node having a unique parent node in each of the higher levels, a process for maintaining each database comprising the steps of:

(a) transmitting a first message with a portable communication unit to a base station in a second cell as the portable communication unit moves out of a first cell and into the second cell and when:
the current address and the new address of the portable communication unit are within the service area of the portable communication unit, and
the new address and the home address of the portable communication unit are not the same at the first layer,
the first message including the current address, the new address and the home address for informing the base station in the second cell that the portable communication unit is going to lock to the base station;

(b) transmitting a second message with a portable communication unit to a base station in the first cell when the portable communication unit moves out of the first cell and into the second cell, and when the current address and the new address of the portable communication unit are within the service area of the portable communication unit, and the current address and the home address of the portable communication unit are not the same at the first layer, the second message including the current address, the new address, and the home address of the portable communication unit for informing the base station in the first cell that the portable is leaving the first cell.

7. The process of claim 6, further comprising the step of:

(c) transmitting a third message with a portable communication unit to a base station that the portable communication unit is locked on to, when the portable is not in its home address and any one of the following conditions occurs:
the portable is turned off inside its service area; or
the portable communication unit is moving out of its service area;
the third message including the current address, and the home address of the portable communication unit, and the third message informing the system that the portable communication unit is leaving the communication system.

8. The process of claim 6, further comprising the step of:

(d) transmitting a fourth message with a portable communication unit to a selected base station within its service area when:
the portable's home address is not within the selected cell; and
the portable is moving into the selected cell from an area that is not in a service area for the portable, or the portable communication unit is activated inside its service area;
the fourth message including the new address, and the home address of the portable communication unit, and the fourth message informing the system that the portable communication unit is entering the communication system.

9. The process of claim 6, wherein the first message is received in a node in layer i, where i is an integer greater than or equal to one, and step (a) further comprises the steps of:

(a1) determining whether i is less than or equal to the number of the highest layer where the new and current addresses of the portable communication unit are different;

(a2) sending the first message to its layer i+1 parent communication service node when the determination of step (a1) is affirmative;

(a3) determining whether i is greater than one;

(a4) determining whether there is an entry for the portable communication unit in the database of the layer i node, when the determination of step (a3) is affirmative;

(a5) determining whether the new address and the home address of the portable communication unit are the same at the $i-1$ layer, when the determination of step (a4) is affirmative;

(a6) removing an entry relating to the portable communication unit at the database of the layer i node when the determination of step (a5) is affirmative, and stopping the process for the communication service node in layer i; and (a7) stopping the process for the communication service node in layer i, when the determination of step a(3) is negative.

10. The process of claim 9, further comprising the steps of (a8) determining whether i is equal to the sum of one and the number of the highest layer where the new address and the current address of the portable communication unit are different, when the determination of step (a1) is negative;

(a9) proceeding to step (a3) when the determination of step (a8) is affirmative; and (a10) determining that an error exists when the determination of step (a8) is negative.

11. The process of claim 10 further comprising the following step, after step (a5):

(a11) updating the $i-1$ layer address relating to the portable communication unit when the determination of step (a5) is negative, and the process stops for the layer i node.

12. The process of claim 11, further comprising the following steps:

(a12) adding a new entry with the address indicating the layer $i-1$ new address of the portable communication unit, and stopping the process for the layer i communication services node, when the determination of step (a4) is negative.

13. The process of claim 6, wherein the second message is received in a base station or a communication service node in layer i, and step (b) further comprises the steps of:

(b1) determining whether i is less than the number of the highest layer where the new address and the current address of the portable communication unit are different;

(b2) sending the second message to its layer $i+1$ parent node, when the determination of step (b1) is affirmative;

(b3) determining whether i is greater than 1;

(b4) determining whether the current address and the home address of the portable communication unit are the same at layer i, when the determination of step (b3) is affirmative; and (b5) adding a new entry relating to the portable communication unit with an out mark in the database at the layer i node, the out mark indicating that the portable communication unit is not at its home address, when the determination of step (b4) is affirmative, and stopping the process for the layer i communication services node.

14. The process of claim 13, further comprising the following step, after step (b1):

(b6) proceeding to step (b3) when the determination of step (b1) is negative.

15. The process of claim 14, further comprising the following steps, after step (b4):

(b7) determining whether the first layer is the highest layer where the current address and the new address of the portable communication unit are different, when the determination of step (b4) is negative; and (b8) removing an entry relating to the portable communication unit in the database of the layer i node, and stopping the process for the layer i communication services node when the determination of step (b7) is negative;

(b9) stopping the process for the layer i communication services node when the determination of stop (b7) is affirmative; and (b10) stopping the process for the layer i communication services node when the determination of step (b3) is negative.

16. The process of claim 7, wherein the third message is received in a node in layer i, and step (c) further comprises the steps of:

(c1) determining whether i is greater than one;

(c2) determining whether the current address and the address of the node, at which the third message was received, are the same at layer i, and whether i is less than or equal to the number of the highest layer where the current address and the home address of the portable communication unit are different, when the determination of step (c1) is affirmative;

(c3) sending the third message to its parent communication services node at the $i+1$ layer, when the determination of step (c2) is affirmative; and (c4) removing an entry relating to the portable communication unit from the database of the node in which the third message was received, and stopping the process for the layer i communication services node.

17. The process of claim 16 further comprising the following steps, after step (c2):

(c5) determining whether the home address of the portable communication unit and the address of the node in which the third message was received are the same at layer i, and whether i is greater than two, when the determination of step (c2) is negative; and (c6) sending the third message to its layer $i-1$ child node along the path leading to the home address of the portable communication unit, and proceeding to step (c4) when the determination of step (c5) is affirmative.

18. The process of claim 17 further comprising the following step, after step (c1):

(c7) sending the third message to its second layer parent node, and stopping the process for the node in the first layer when the determination of step (c1) is negative.

19. The process of claim 8, wherein the node is in layer i, and step (d) further comprises the following steps:

(d1) determining whether i is greater than one;

(d2) determining whether i equals two, and whether the new address of the portable communication unit and the address of the node at which the fourth message was received, are the same at layer i when the determination of step (d1) is affirmative;

(d3) determining whether the portable communication unit is authentic when the determination of step (d2) is affirmative;

(d4) determining whether the new address of the portable communication unit and the address of the node at which the fourth message was received, are the same at layer i, when the determination of step (d3) is affirmative;

(d5) determining whether i is less than or equal to the number of the highest layer where the new address and the home address of the portable communication unit are different, when the determination of step (d4) is affirmative;

(d6) sending the fourth message to its layer $i+1$ parent node, when the determination of step (d5) is affirmative;

(d7) adding an entry with the layer $i-1$ address of the portable communication unit, and stopping the process for the layer i communication services node; and (d8) determining whether i is greater than two when the determination of step (d5) is negative; and (d9) proceeding to step (d7) when step (d8) is negative.

20. The process of claim 19 further comprising the following steps, after step (d8):
    (d10) sending the fourth message to the layer $i-1$ child communication services node along a path leading to the home address of the portable communication unit, and proceeding to step (d7), when the determination of step (d8) is affirmative.

21. The process of claim 20, further comprising the following step, after step (d1):
    (d11) sending the fourth message to its second layer parent communication services node, and stopping the process for the first layer communication services node, when the determination of step (d1) is negative.

22. The process of claim 21 further comprising the following step, after steps (d4):
    (d12) determining whether the home address of the portable communication unit and the address of the node at which the fourth message was received, are the same at layer i, when the determination of step (d4) is negative;
    (d13) determining whether i is greater than two when the determination of step (d12) is affirmative;
    (d14) sending the fourth message to the layer $i-1$ child communication services node along a path leading to home address of the portable communication unit, when the determination of step (d13) is affirmative; and
    (d15) adding a new entry relating to the portable communication unit with an out mark in the database at the layer i node, and stopping the process for the layer i node, the out mark indicating that the portable communication unit is not at its home address.

23. The process of claim 22 further comprising the following step, after step (d2):
    (d16) proceeding to step (d4) when the determination of step (d2) is negative.

24. The process of claim 23 further comprising the following step, after step (d12):
    (d17) determining that an error has occurred when the determination of step (d12) is negative.

25. The process of claim 24 further comprising the following step, after step (d13):
    (d18) proceeding to step (d15) when the determination of step (d13) is negative.

26. The process of claim 19 further comprising the following step, after step (d3):
    (d19) stopping the process for layer i, when the determination of step (d3) is negative.

* * * * *